US012643204B2

(12) United States Patent
Graham

(10) Patent No.: US 12,643,204 B2
(45) Date of Patent: Jun. 2, 2026

(54) NUT FEEDING WRENCH

(71) Applicant: Matthew Graham, Auburndale, FL (US)

(72) Inventor: Matthew Graham, Auburndale, FL (US)

( * ) Notice: Subject to any disclaimer, the term of this patent is extended or adjusted under 35 U.S.C. 154(b) by 310 days.

(21) Appl. No.: 18/582,812

(22) Filed: Feb. 21, 2024

(65) Prior Publication Data

US 2024/0308037 A1 Sep. 19, 2024

Related U.S. Application Data

(60) Provisional application No. 63/490,543, filed on Mar. 16, 2023.

(51) Int. Cl.
*B25B 23/04* (2006.01)
*B25B 13/48* (2006.01)

(52) U.S. Cl.
CPC ............ *B25B 23/04* (2013.01); *B25B 13/481* (2013.01)

(58) Field of Classification Search
CPC ....... B25B 13/481; B25B 23/04; B25B 23/06; B25B 23/0057
USPC ................... 81/180.1, 58.2, 177.4, 125, 185, 81/176.1–17.2, 490
See application file for complete search history.

(56) References Cited

U.S. PATENT DOCUMENTS 1,537,929 A * 5/1925 Lee ....................... B25B 23/065 81/177.4
2,611,289 A * 9/1952 Frank .................... B25B 23/065 81/125
4,302,990 A * 12/1981 Chrichton ............. B25G 1/085 81/177.4
4,722,466 A * 2/1988 Hsu ........................... B25C 1/02 227/63
5,842,394 A * 12/1998 Hwang .................. B25G 1/063 81/439
6,557,727 B1 * 5/2003 Robertson ............. B25B 23/065 81/124.1
7,743,684 B2 * 6/2010 Guile .................... B25B 23/065 81/125

* cited by examiner

*Primary Examiner* — Hadi Shakeri
(74) *Attorney, Agent, or Firm* — Lewellyn Law, PLLC; Stephen Lewellyn

(57) ABSTRACT

A magazine-style wrench that laterally feeds multiple nuts down a magazine-style rail into a hexagonal head for dispensing and tightening. As a bolt is inserted into the hexagonal opening the threads of the bolt mesh into those of the nuts. The compressional force provided by a rectangular spring provides the necessary force to push the row of nuts forward and prevent the nut held in the opening from unintentionally falling out of the tool. The tool can be used to repeatedly tighten nuts onto bolts without personal handling. When out of nuts, the tool can be refilled and used again.

16 Claims, 15 Drawing Sheets

NUT FEEDING WRENCH

REFERENCE TO CORRESPONDING APPLICATIONS

This application claims the benefit of U.S. Provisional Application No. 63/490,543, filed Mar. 16, 2023, the entirety of which is incorporated herein by reference.

FIELD OF THE INVENTION

The present disclosure relates to fastening threaded fasteners and, more particularly, to a wrench having a magazine carrying a plurality of nuts that are sequentially fed for fastening.

BACKGROUND OF THE INVENTION

Handling large quantities of nuts can be a time-consuming process because a user must first place the nut onto the threads of a bolt and then twist the nut until it is secure on the shaft of the bolt. The user must then use a separate wrench or tool to tighten the nut so that it does not come loose.

In various work environments, from individual consumer use to high-production workplaces such as those of assembly lines where large quantities of nuts are handled, there is a demand for an increase in production speed and efficiency. When handling large quantities of nuts, it can be difficult to tighten the nuts onto the back of the bolts if working with limited space as one's hand must also fit into the same space with it. Therefore, if the opening where the nut in question is being placed is small, the user's hand may not fit in the opening.

Accordingly, there is a need and desire to have a new wrench that holds and feeds for securing to a threaded fastener, such as a bolt.

SUMMARY OF THE INVENTION

Embodiments of the invention provide a wrench that feeds a nut to the wrench head (i.e., box wrench) for fastening to a bolt. A purpose of the wrench is to increase the speed and ease of working with various-sized nuts, so the user doesn't need to handle loose nuts when working. The wrench is useful when working in awkward positions where the nut may be difficult to place and is at risk of being dropped or lost.

In aspects, the wrench uses a lateral loading nut magazine to feed a row of nuts into a wrench head. The wrench head uses a hexagonal opening as a dispensing point for the nuts and as a wrench to tighten the nuts. Once all the nuts in the nut magazine have been dispensed, they can then be refilled for continued use.

As mentioned above, when fastening a nut to a bolt a user must then use a separate wrench or tool to tighten the nut so that it does not come loose. Embodiments of the invention eliminates the need for this as one simply just needs to place the hexagonal opening of the tool over the bolt so that the shaft of the bolt contacts the center hole of the nut and turns the bolt, or the invented tool, so the nut will thread up the bolt. Once the nut has threaded up the bolt till it can no longer continue, the nut will be pulled to disengage from the rail of the tool and the hexagonal opening. The nut can then be removed from the tool or kept inside where the outer walls of the hexagonal opening will act as a normal wrench so the tool can be used to tighten the nut onto the bolt completely. After the nut is removed, the compressive force from the spring will push the row of nuts forward placing a new one in the hexagonal opening. The invention, therefore, can be used to greatly increase the speed of assembly processes by serving multiple purposes at once.

In one aspect, a nut feeding wrench may have a wrench head having a nut receiving opening for receiving and retaining a nut for threading onto a threaded fastener by the wrench. The wrench head may have a threaded fastener opening extending through the center of the nut receiving opening. The wrench head may have a nut conveying opening extending laterally through the sidewall of the nut receiving opening; a nut magazine may have a length and a nut retaining channel extending along its length and configured to slidingly hold a plurality of nuts in a side-by-side orientation. The nut magazine is removably connectable to the wrench head such that when connected to the wrench head the nut retaining channel is aligned with the nut conveying opening.

In an aspect, the nut receiving opening may be hexagonal shaped. In an aspect, the wrench head may have a magazine receiving opening and wherein the nut magazine is removably received by the magazine receiving opening to removably connect the wrench head and the nut magazine. In an aspect, a spring may be held by the nut magazine and configured to bias nuts in the nut retaining channel through the nut conveying opening. In an aspect, the nut magazine may have a slot extending along its length that is open to the nut retaining channel, and a spring block may be slidingly disposed in the nut retaining channel, the spring block may have a jutting member that extends outwardly through the slot.

In an aspect, the nut feeding wrench may have a nut retaining mechanism having at least two ball bearings captively held by the wrench head and projecting through the sidewall of the nut receiving opening, the at least two ball bearings being spring biased laterally in a direction toward the nut receiving opening. In an aspect, the at least two ball bearings may be disposed toward an open end of the nut receiving open at a distance from a closed end of the nut receiving opening to provide a space between the at least two ball bearing and the closed end into which a nut is received from the nut conveying channel. In an aspect, the nut feeding wrench may have a latch configured to releasably retain the wrench head and the nut magazine together.

In an aspect, a nut feeding wrench may have a wrench head having a nut receiving opening for receiving and retaining a nut for threading onto a threaded fastener by the wrench. The nut receiving opening may have an open end, a closed end, and a sidewall extending therebetween. The wrench head may have a threaded fastener opening extending axially through the center of the nut receiving opening and through the closed end. The wrench head may have a nut conveying opening extending laterally through the sidewall of the nut receiving opening. A nut magazine may have opposite ends, a length extending therebetween, and a nut retaining channel extending along its length and configured to slidingly hold a plurality of nuts in a side-by-side orientation. The nut magazine is removably connectable to the wrench head such that when connected to the wrench head the nut retaining channel is aligned with the nut conveying opening.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized, and changes can be made without departing from the scope of the disclosure.

Figure 1:
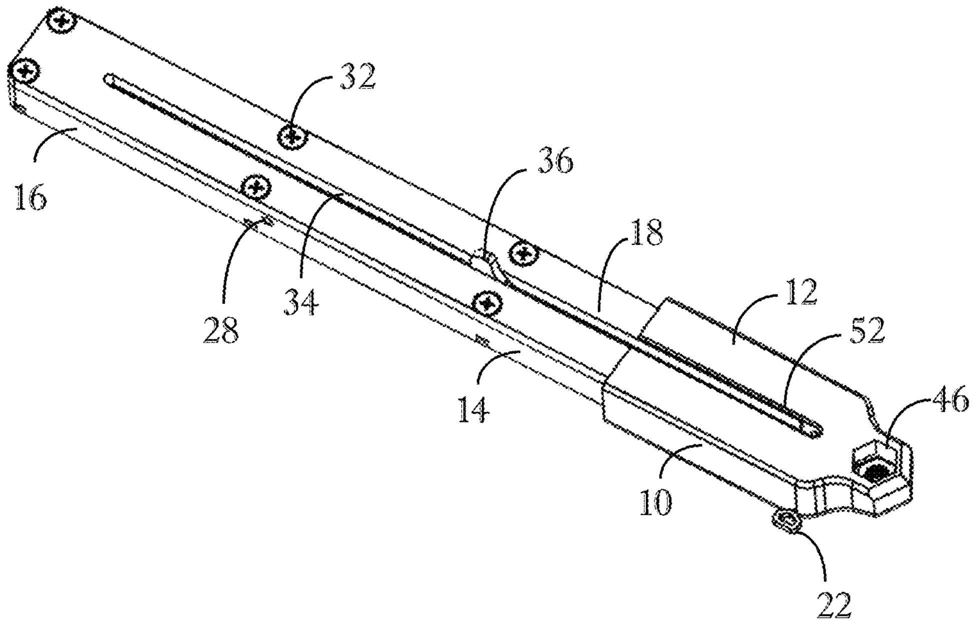
FIG. 1 is a first perspective view of a nut feeding wrench constructed in accordance with an embodiment of the invention.
Figure 2:
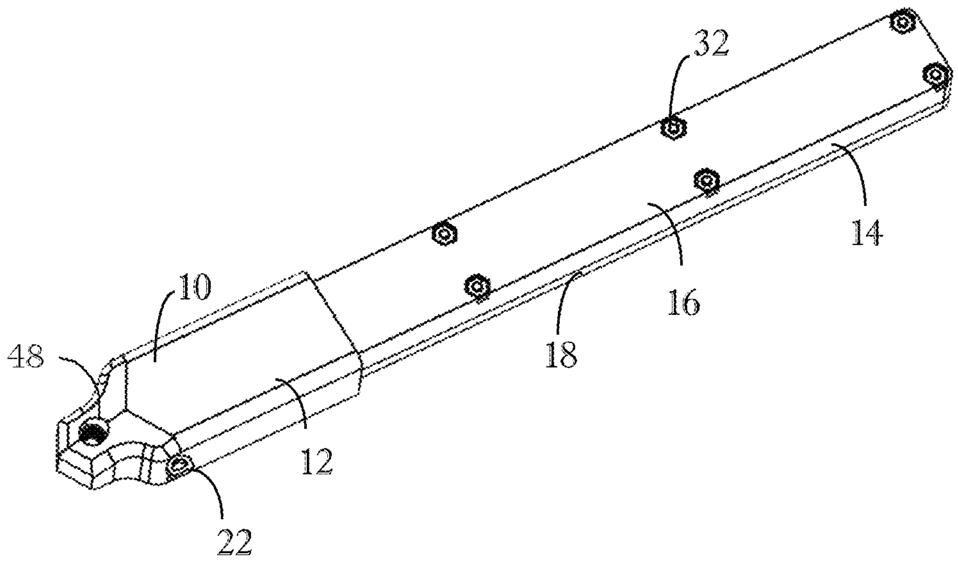
FIG. 2 is a second perspective view of the nut feeding wrench.
Figure 3:
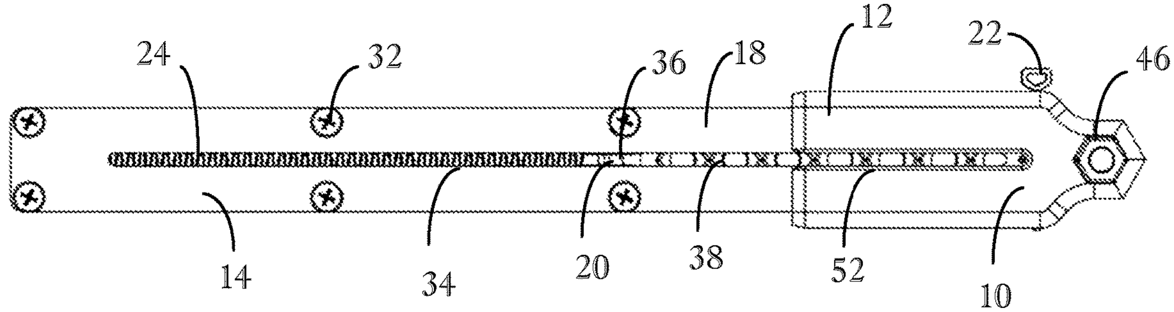
FIG. 3 is a plan view of the nut feeding wrench.
Figure 4:
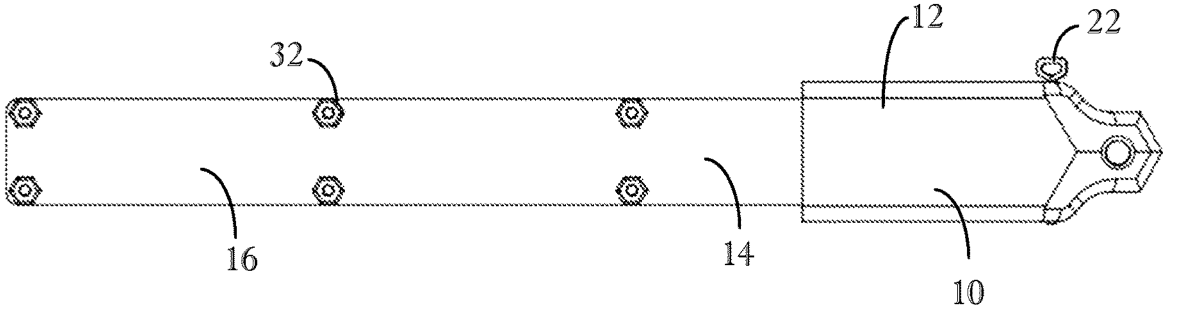
FIG. 4 is a second plan view of the nut feeding wrench.
Figure 5:
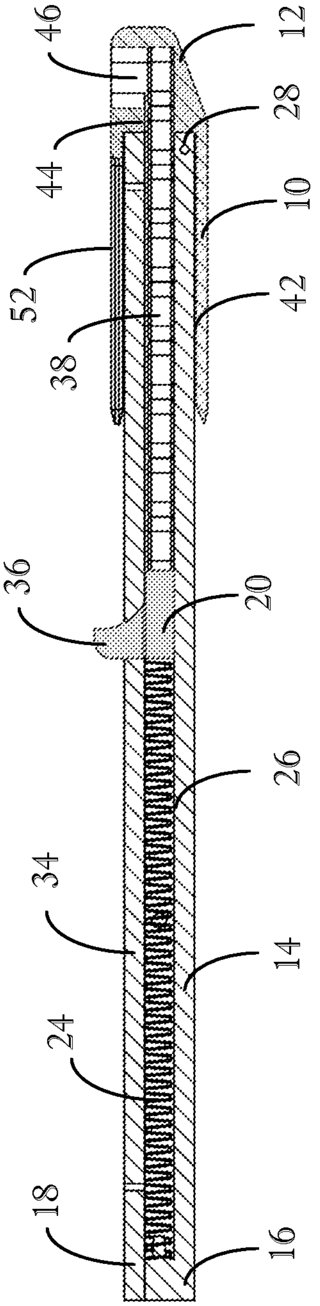
FIG. 5 is a first cross-sectional view of the nut feeding wrench.
Figure 6:
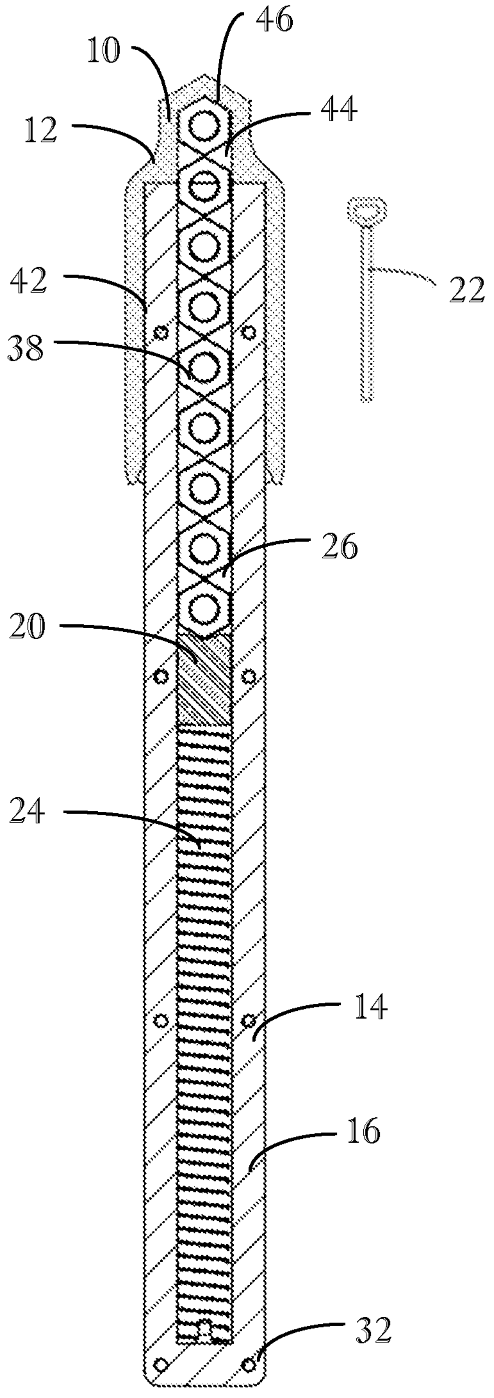
FIG. 6 is a second cross-sectional view showing a locking pin outside the wrench head.
Figure 7:
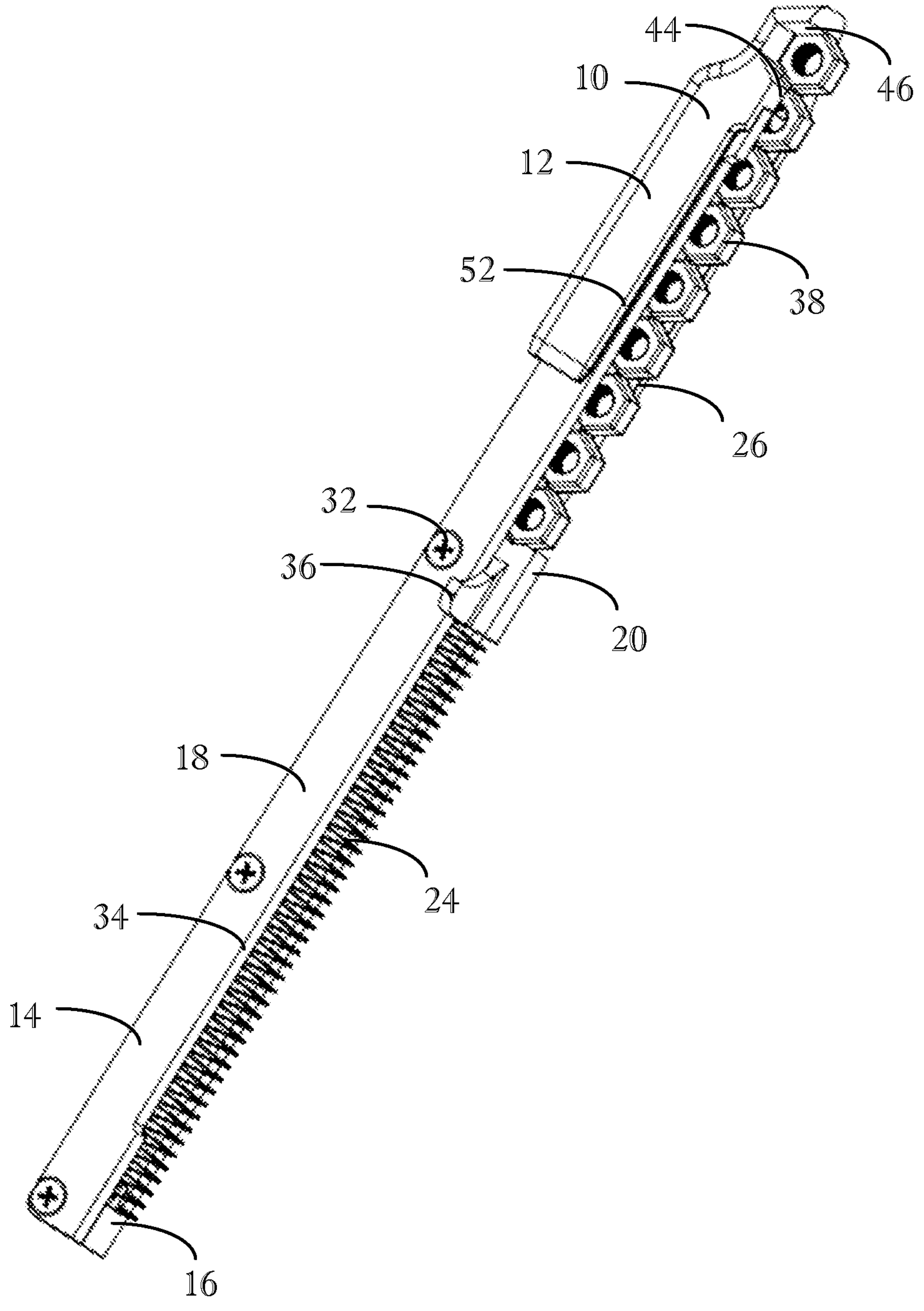
FIG. 7 is a perspective cross-sectional view of the nut feeding wrench.
Figure 8:
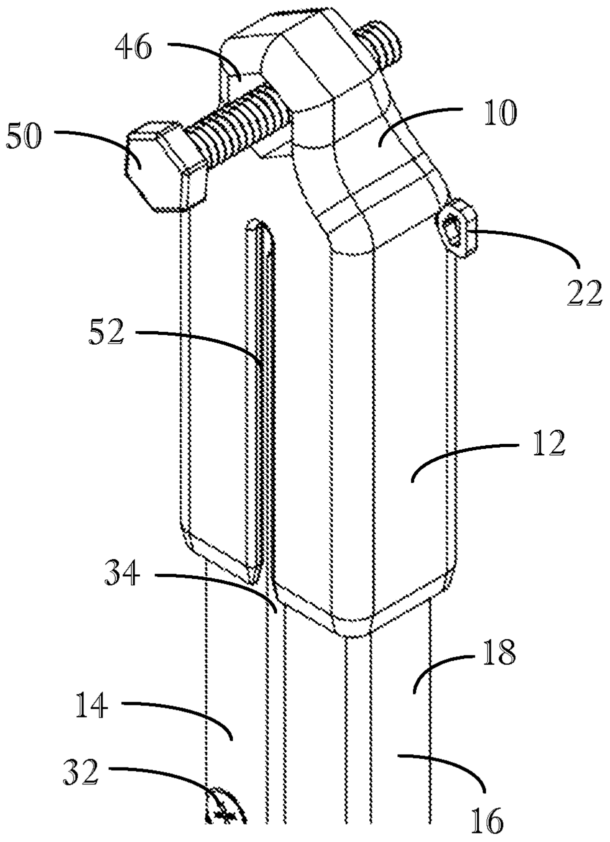
FIG. 8 is an enlarged perspective view of the wrench head of the nut feeding wrench.
Figure 9:
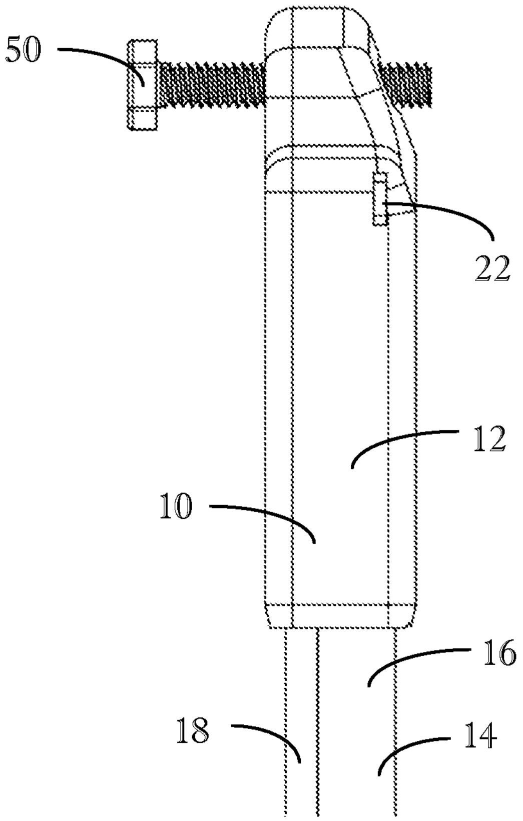
FIG. 9 is an enlarged side view of the wrench head of the nut feeding wrench.
Figure 10:
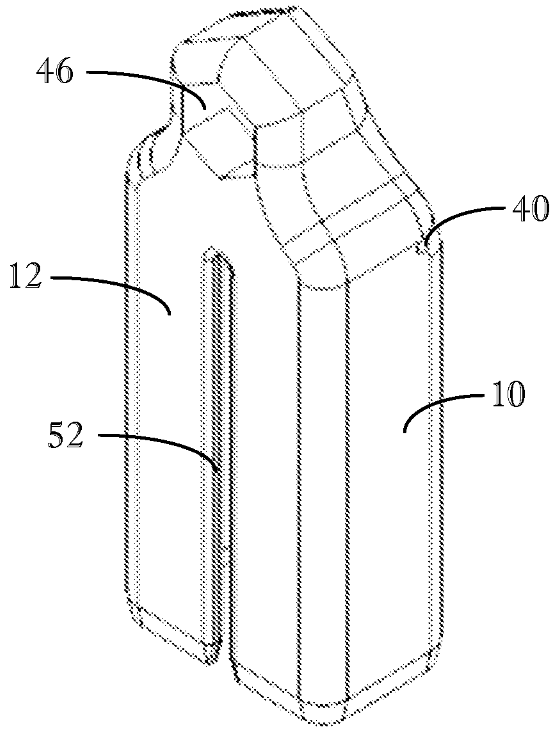
FIG. 10 is a perspective view of the wrench head.
Figure 11:
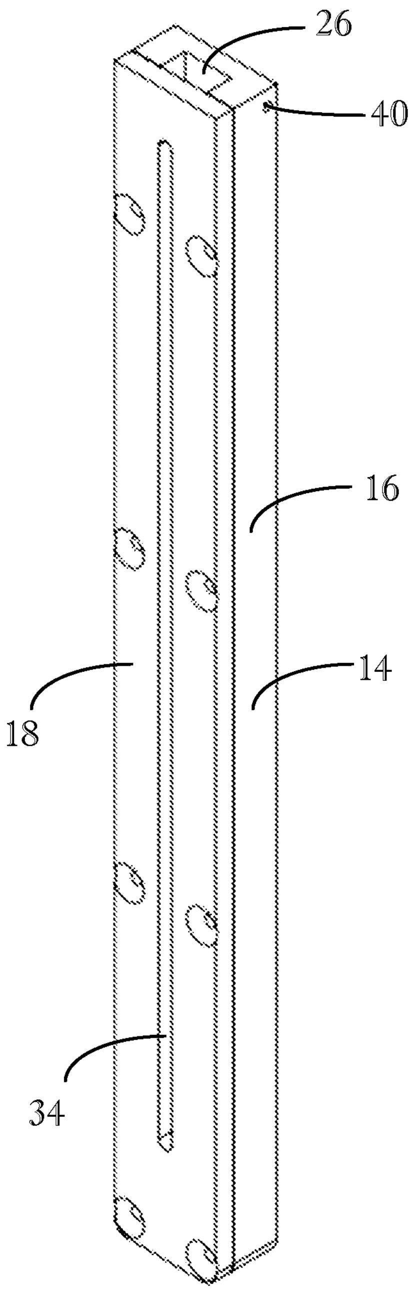
FIG. 11 is a perspective view of the nut magazine.

Turning now to the FIGS. 1-11 of the drawings, a nut feeding wrench 10 in accordance with at least one embodiment of the invention is illustrated. The wrench has two main components the wrench head 12 and the nut magazine 14 that feeds nuts in the magazine to the wrench head. Magazine 14 has a body 16, a lid 18, a spring block 20, a locking pin 22, and a rectangular spring 24.

Body 16 of the nut magazine 14 is largely comprised of an internal rectangular channel 26. It has a cross-sectional width slightly larger than the distance between the parallel sides of a hexagonal nut and a cross-sectional height slightly larger than the thickness of the nut. Body 16 also has a hole 28 near the open end into which a locking pin 22 can be inserted.

Lid 18 of the nut magazine 14 is approximately the same in width and length as the nut magazine's body and has multiple holes 30 allowing the two components to be bolted together by fasteners 32. Lid 18 also has a long slot 34 that extends from near the bottom of the lid to near the top. Slot 34 is intended to allow for control of spring block 20 using its jutting member 36 that extends out from the slot.

Spring block 20 is sliding disposed in channel 26 and positioned between the rectangular spring 24 and a row of nuts 38 to allow the user to adjust the position of the spring. This is useful when loading nut magazine 14 as it allows the compressive force of the spring on the nuts 38 to be released. Spring block 20 has cross-sectional dimensions slightly smaller than those of the nut magazine's channel 26 allowing it to slide freely up and down the internal channel of the nut magazine 14. Member 36 has a slightly smaller thickness than slot 34 on the nut magazine's lid 18 and a length extending just past the lid when the tool is assembled. Member 36 allows the user to control the location of the spring block 20 in the nut magazine.

Nut magazine 14 uses a metal locking pin 22 with a length equal to the width of the wrench head 12. Locking pin 22 is used to hold together the nut magazine and the wrench head when they are connected through their aligning holes 40 and 28.

The rectangular spring 24 used in the nut magazine has cross-sectional dimensions slightly smaller than those of the nut magazine's channel 26. Its length is slightly longer than that of the nut magazine, so it provides constant compressive force while inside the nut magazine.

Wrench head 12 has nut magazine receiving opening 42, a nut conveying opening 44, the locking hole 40, and a hexagonal nut receiving opening 46. Magazine receiving opening 42 is configured to receive the open end of nut magazine 14 and has cross-sectional dimensions allowing the magazine to be inserted into the wrench head 12. Nut conveying opening 44 has cross-sectional dimensions equal to that of the nut magazine's channel 26 and is disposed such that when nut magazine 14 is inserted into the wrench head 12 the nuts 38 will have an unobstructed path to the wrench head's hexagonal opening 46, wherein a nut 38 is conveyed from channel 26 through opening 44 and into the hexagonal opening 46.

The nut receiving hexagonal opening 46 has an open end through which a nut is free to pass and an opposite closed end. A bolt opening 48 extends transversely through the center of the hexagonal opening 46 and through its closed end. The bolt opening 48 is configured to receive a bolt 50 to which a nut 38 is to be threaded. Wrench head 12 further has a slot 52 that aligns with slot 34 when the wrench head and nut magazine 14 are coupled. Slot 52 is configured to slidingly receive the jutting member 36 of the spring block 20.

The body 16 and lid 18 bolt together by fasteners 32, the rectangular spring 24 sits sandwiched between the body and lid while pushing the spring block 20 down the nut magazine channel 26. The magazine can 14 be loaded by compressing the spring 24 using the spring block 20 and dropping the nuts 38 into the magazine opening and into channel 26. A secondary rectangular funnel tool can be used to load the nuts faster. Once the nut magazine 14 is filled with the preferential number of nuts, it can be inserted into the wrench head 12. Locking pin 22 can then be placed through the wrench head and nut magazine's aligning holes 40 and 28 to prevent the force of the spring from pushing the two components apart.

Figure 12:
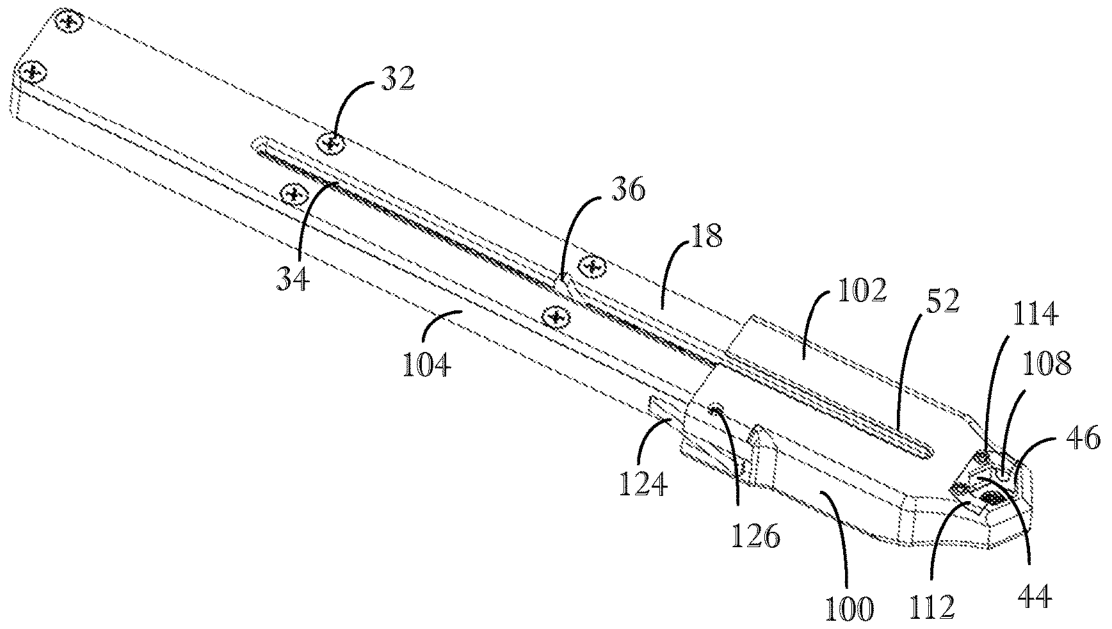
FIG. 12 a first perspective view of a nut feeding wrench constructed in accordance with another embodiment of the invention.
Figure 13:
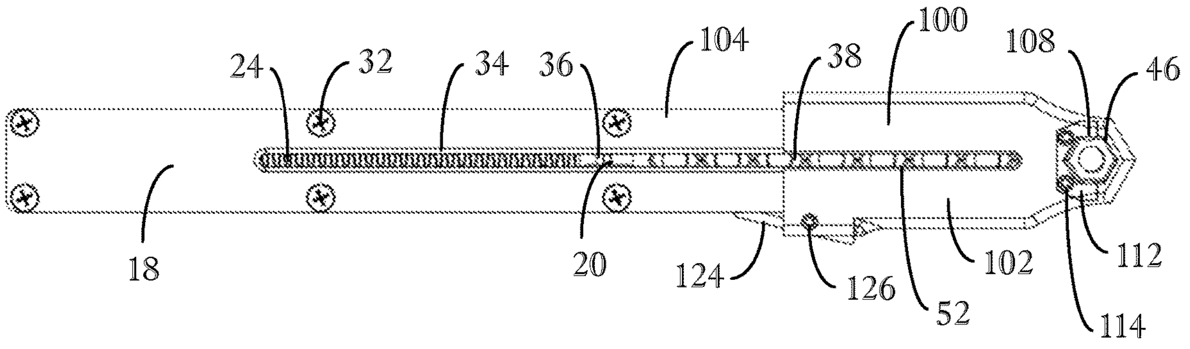
FIG. 13 is a is a plan view of the nut feeding wrench of FIG. 12.
Figure 14:
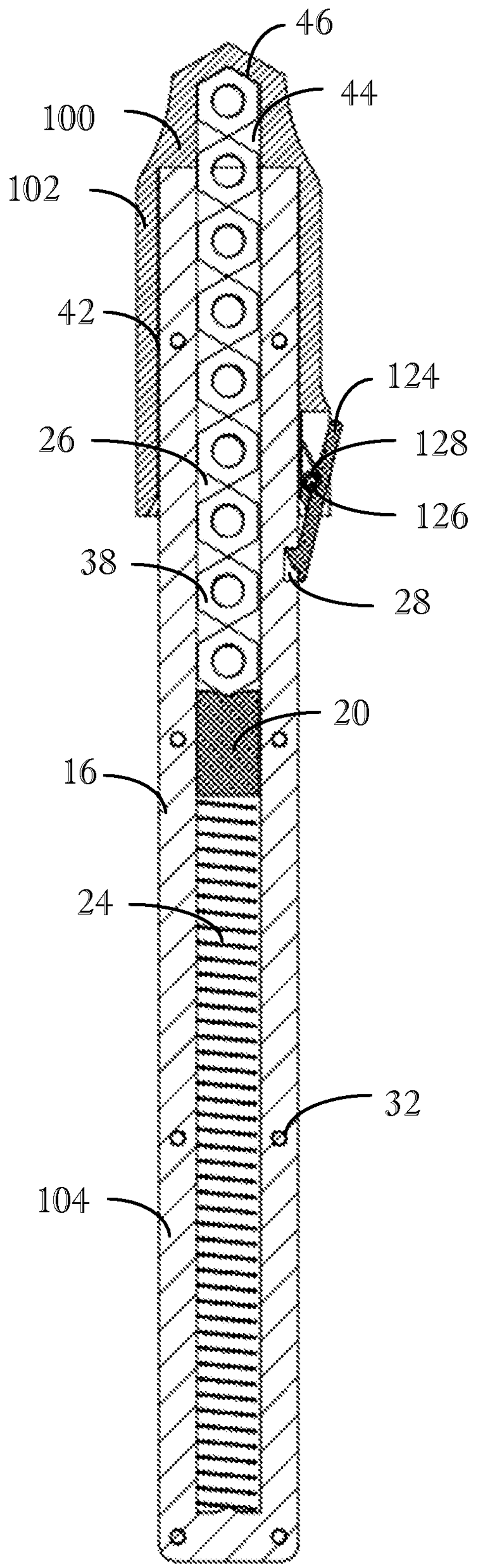
FIG. 14 is a cross-sectional view of the nut feeding wrench of FIG. 12.
Figure 15:
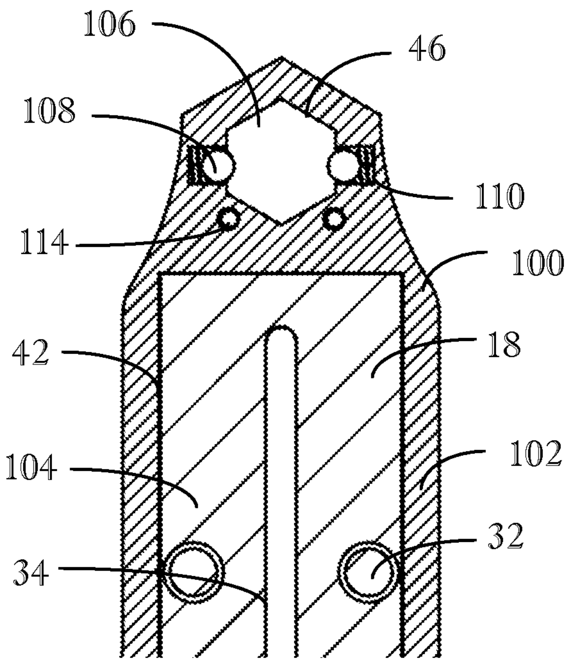
FIG. 15 is an enlarged cross-sectional view of the nut feeding wrench of FIG. 12.
Figure 16:
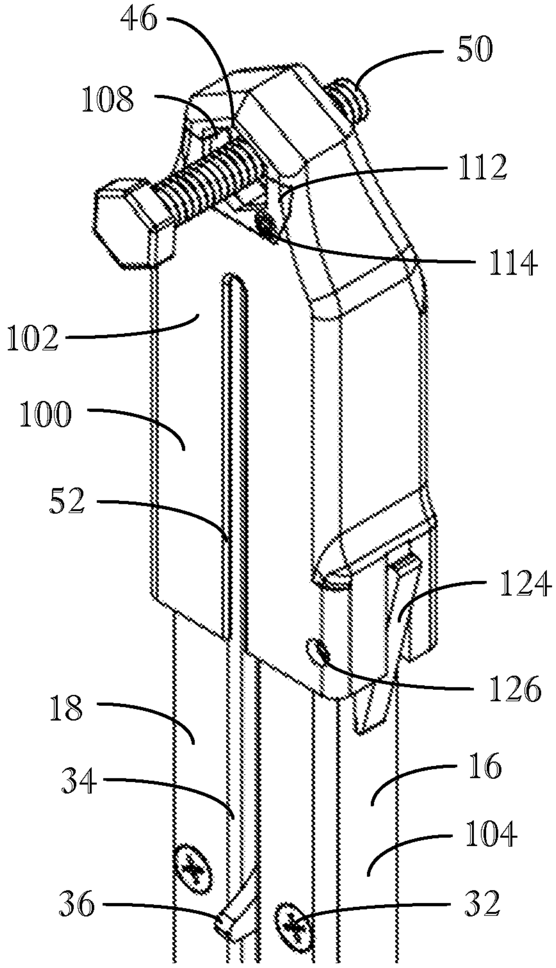
FIG. 16 is an enlarged, partial perspective view of the nut feeding wrench of FIG. 12.
Figure 17:
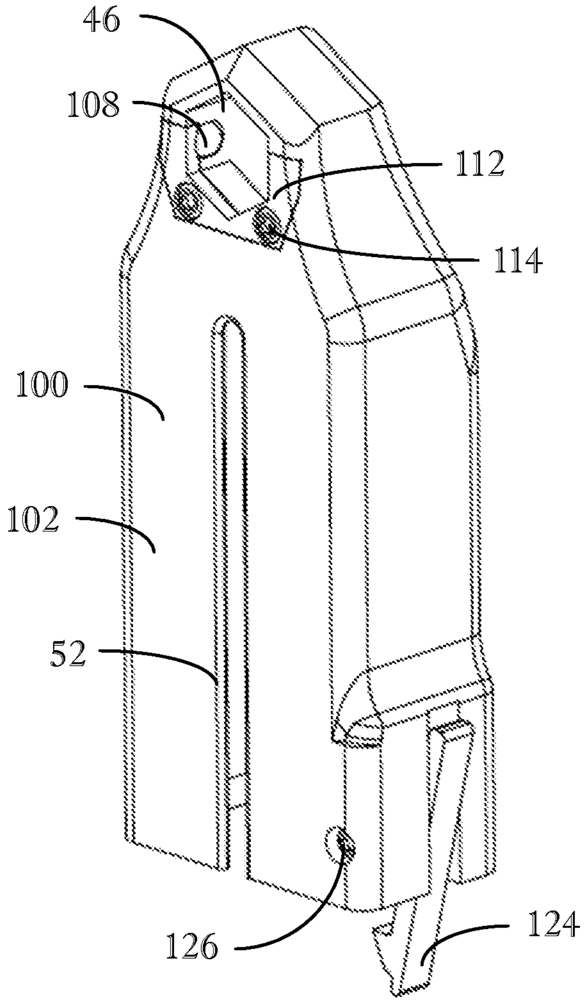
FIG. 17 is a perspective view of a wrench of the nut feeding wrench of FIG. 12.
Figure 18:
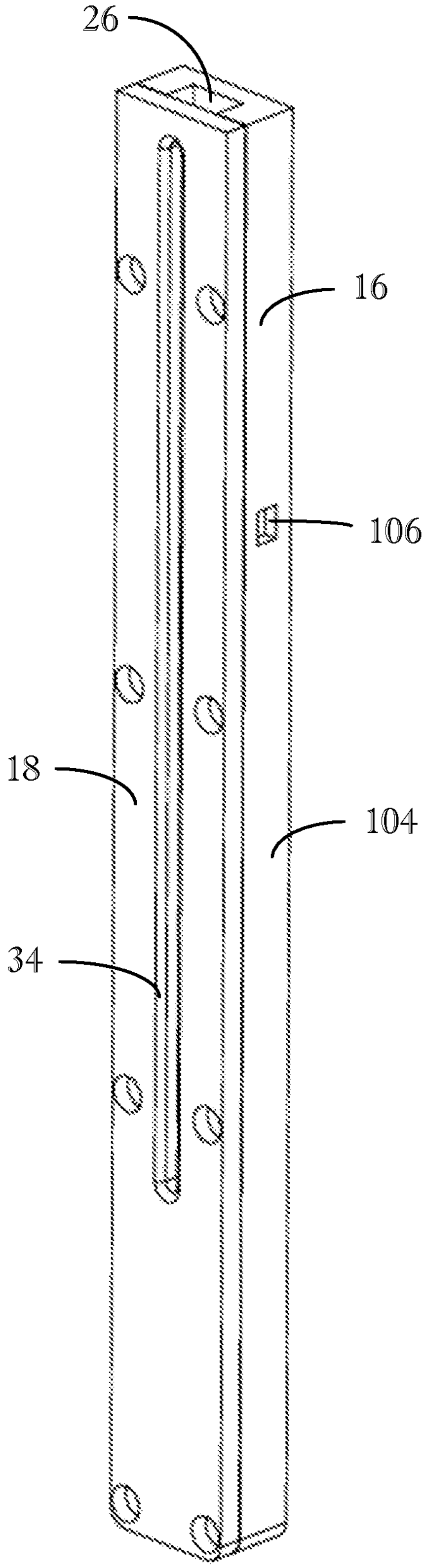
FIG. 18 is a perspective view of a nut magazine of the nut feeding wrench of FIG. 12.

In FIGS. 12-18 there is illustrated a nut feeding wrench 100 in accordance with another embodiment of the invention. Like reference numbers refer to the same or similar elements of wrench 10 as discussed above. Wrench 100 has wrench head 102 and nut magazine 104. The main difference between nut magazine 14 and nut magazine 104, is that magazine 104 does not have hole 28 and has opening 106 that couples to a latch of the wrench head 102 as further described below.

Wrench head 102 has a similar construction to wrench head 12 as discussed above, but further includes a nut retaining mechanism and a latch mechanism that replaces the locking pin 22. The nut retaining mechanism includes ball bearings 108, springs 110, and a bearing cap 112. Ball bearings 108 are captively retained in respective, opposing openings formed in the sidewall of the head opening 46. Springs 110 laterally push the ball bearings 108 towards the hexagonal opening 46 and provide an adequate obstruction in the opening so a nut cannot be removed from the hexagonal opening unintentionally. Once an adequate amount of force is translated to the springs by removing a nut the bearings will compress into the walls of the wrench head allowing the nut to pass through. Springs 110 and bearings 108 are held in place in the wrench head body by the bearing cap 122 which is held in place by small bolts 114.

The latch mechanism includes a latching lever 124 that is pivotally connected to a side of the wrench head 102 by a bolt 126, for example. One end of lever 124 is notched and configured to be received by the opening 106 that disposed on a side of the nut magazine 104 and an opposite end that is configured to be pressed by a user's finger for example. A spring such as a small torsion spring 128 may bias the lever 124 into a locking position where the notched end is received by the corresponding opening 106. Locking opening 106 is dimensioned and located such that the lever snaps into it once the magazine body 104 is inserted into the wrench head 102. This can be accomplished because the locking lever 124 is pushed by the small torsion spring 128. Pressing the opposite end of the lever 124 releases it from the locking opening 106 and permits decoupling of the wrench head 102 and the nut magazine 104.

While a number of examples have been described for illustration purposes, the foregoing description is not intended to limit the scope of the invention, which is defined by the scope of the appended claims. There are and will be other examples and modifications within the scope of the following claims.

The invention claimed is:

1. A nut feeding wrench, comprising:

a wrench head having a nut receiving opening for receiving and retaining a nut for threading onto a threaded fastener by the wrench;

the wrench head having a threaded fastener opening extending through a center of the nut receiving opening;

the wrench head having a nut conveying opening extending laterally through a sidewall of the nut receiving opening;

a nut magazine having a length and a nut retaining channel extending along its length and configured to slidingly hold a plurality of nuts in a side-by-side orientation; and the nut magazine removably connectable to the wrench head such that when connected to the wrench head the nut retaining channel is aligned with the nut conveying opening.

2. The nut feeding wrench of claim 1, wherein the nut receiving opening is hexagonal shaped.

3. The nut feeding wrench of claim 1, wherein the wrench head further has a magazine receiving opening and wherein the nut magazine is removably received by the magazine receiving opening to removably connect the wrench head and the nut magazine.

4. The nut feeding wrench of claim 1, further comprising a spring held by the nut magazine and configured to bias nuts in the nut retaining channel through the nut conveying opening.

5. The nut feeding wrench of claim 1, wherein the nut magazine has a slot extending along its length that is open to the nut retaining channel, and a further comprising a spring block slidingly disposed in the nut retaining channel, the spring block having a jutting member that extends outwardly through the slot.

6. The nut feeding wrench of claim 1, further comprising:

a nut retaining mechanism having at least two ball bearings captively held by the wrench head and projecting through the sidewall of the nut receiving opening, the at least two ball bearings being spring biased laterally in a direction toward the nut receiving opening.

7. The nut feeding wrench of claim 6, wherein the at least two ball bearings are disposed toward an open end of the nut receiving open at a distance from a closed end of the nut receiving opening to provide a space between the at least two ball bearing and the closed end into which a nut is received from the nut conveying channel.

8. The nut feeding wrench of claim 1, further comprising:

a latch configured to releasably retain the wrench head and the nut magazine together.

9. A nut feeding wrench, comprising:

a wrench head having a nut receiving opening for receiving and retaining a nut for threading onto a threaded fastener by the wrench, the nut receiving opening having an open end, a closed end, and a sidewall extending therebetween;

the wrench head having a threaded fastener opening extending axially through a center of the nut receiving opening and through the closed end;

the wrench head having a nut conveying opening extending laterally through the sidewall of the nut receiving opening;

a nut magazine having opposite ends, a length extending therebetween, and a nut retaining channel extending along its length and configured to slidingly hold a plurality of nuts in a side-by-side orientation; and the nut magazine removably connectable to the wrench head such that when connected to the wrench head the nut retaining channel is aligned with the nut conveying opening.

10. The nut feeding wrench of claim 9, wherein the nut receiving opening is hexagonal shaped.

11. The nut feeding wrench of claim 10, wherein the wrench head further has a magazine receiving opening and wherein the nut magazine is removably received by the magazine receiving opening to removably connect the wrench head and the nut magazine.

12. The nut feeding wrench of claim 11, further comprising a spring held by the nut magazine and configured to bias nuts in the nut retaining channel through the nut conveying opening.

13. The nut feeding wrench of claim 12, wherein the nut magazine has a slot extending along its length that is open to the nut retaining channel, and a further comprising a spring block slidingly disposed in the nut retaining channel, the spring block having a jutting member that extends outwardly through the slot.

14. The nut feeding wrench of claim 9, further comprising:

a nut retaining mechanism having at least two ball bearings captively held by the wrench head and projecting through the sidewall of the nut receiving opening, the at least two ball bearings being spring biased laterally in a direction toward the nut receiving opening.

15. The nut feeding wrench of claim 14, wherein the at least two ball bearings are disposed toward the open end of the nut receiving open at a distance from the closed end of the nut receiving opening to provide a space between the at least two ball bearing and the closed end into which a nut is received from the nut conveying channel.

16. The nut feeding wrench of claim 9, further comprising:

a latch configured to releasably retain the wrench head and the nut magazine together.

* * * * *